United States Patent
Cuder et al.

(10) Patent No.: US 10,920,033 B2
(45) Date of Patent: Feb. 16, 2021

(54) EXPANDABLE VINYL AROMATIC COMPOSITION CONTAINING FUNCTIONALIZED ETHYLENE-VINYL ACETATE COPOLYMER

(71) Applicant: Versalis S.p.A., San Donato Milanese (IT)

(72) Inventors: Giovanni Cuder, Mantova (IT); Stefano Comba, Bagnolo Piemonte (IT); Aldo Longo, Mantova (IT)

(73) Assignee: Versalis S.P.A., San Donato Milanese (IT)

( * ) Notice: Subject to any disclaimer, the term of this patent is extended or adjusted under 35 U.S.C. 154(b) by 82 days.

(21) Appl. No.: 16/314,047

(22) PCT Filed: Jul. 28, 2017

(86) PCT No.: PCT/IB2017/054599
§ 371 (c)(1),
(2) Date: Dec. 28, 2018

(87) PCT Pub. No.: WO2018/020468
PCT Pub. Date: Feb. 1, 2018

(65) Prior Publication Data
US 2019/0315937 A1 Oct. 17, 2019

(30) Foreign Application Priority Data

Jul. 29, 2016 (IT) .................. 102016000079947

(51) Int. Cl.
*C08J 9/14* (2006.01)
*C08J 9/18* (2006.01)
*C08J 9/00* (2006.01)
*C08J 9/232* (2006.01)

(52) U.S. Cl.
CPC ............. *C08J 9/149* (2013.01); *C08J 9/0061* (2013.01); *C08J 9/18* (2013.01); *C08J 9/232* (2013.01); *C08J 2201/03* (2013.01); *C08J 2325/02* (2013.01); *C08J 2423/08* (2013.01)

(58) Field of Classification Search
CPC .... C08F 212/08; C08F 255/02; C08F 263/04; C08J 9/0061; C08J 9/14; C08J 9/149; C08J 9/16; C08J 9/18; C08J 9/232; C08J 2201/03; C08J 2325/02; C08J 2423/08; C08L 23/0853; C08L 25/06; C09D 125/06
See application file for complete search history.

(56) References Cited

U.S. PATENT DOCUMENTS

| | | |
|---|---|---|
| 3,177,269 A | 4/1965 | Nowak et al. |
| 3,535,408 A | 10/1970 | Ronden |
| 4,282,334 A | 8/1981 | Walter et al. |
| 4,612,155 A | 9/1986 | Wong et al. |
| 4,692,471 A | 9/1987 | Fudge |
| 6,063,823 A * | 5/2000 | Nakatani ................ C08J 9/0061 521/81 |
| 6,331,595 B1 | 12/2001 | Mitchell et al. |
| 7,320,585 B2 | 1/2008 | Casalini et al. |
| 2004/0015279 A1 | 1/2004 | Barron et al. |
| 2007/0249784 A1* | 10/2007 | Matsumura ............. C08L 25/06 524/856 |
| 2010/0143697 A1 | 6/2010 | Schips et al. |
| 2011/0065819 A1 | 3/2011 | Schips et al. |
| 2011/0268972 A1 | 11/2011 | Schips et al. |
| 2013/0140728 A1 | 6/2013 | Schips et al. |

FOREIGN PATENT DOCUMENTS

| | | |
|---|---|---|
| CA | 149002 A | 7/1913 |
| CA | 2148991 A1 | 11/1995 |
| CA | 2148992 A1 | 11/1995 |
| DE | 2413375 A1 | 10/1975 |
| DE | 2413408 A1 | 10/1975 |

(Continued)

OTHER PUBLICATIONS

International Search Report for PCT/IB2017/054599 dated Nov. 7, 2017, 12 pages.
R.D. Cadle, "Particle Size Analysis"—New York (1965), p. 27-50.
Xanthos M. and Dagli S.S. Polymer Engineering and Science 31(13), 1991, pp. 929-935.
Office action for Russian patent application 2018137867/04(062773) dated Sep. 30, 2020, 5 pages (Translation in English provided).

(Continued)

*Primary Examiner* — Irina S Zemel
(74) *Attorney, Agent, or Firm* — Praedcere Law

(57) ABSTRACT

The present invention relates to polymeric compositions that can be used for producing packaging with dynamic cushioning, with a pleasant touch, with reduced abrasive power, in which the expanded particles constituting the packaging adhere well to one another and do not come detached during use. Said compositions comprise: a) from 70% to 90% by weight of a vinyl aromatic polymer and/or copolymer, calculated with respect to (a)+(b); b) from 10% to 30% by weight of an ethylene-vinyl acetate copolymer (EVA) containing a percentage that ranges from 10% to 30% by weight of vinyl acetate, calculated with respect to (a)+(b); c) from 3 to 10 parts by weight of a blowing agent, calculated on 100 parts of component a) added to component b); said copolymer (b) being distributed in the polymer (a) in the form of particles having an average volumetric diameter ranging from 1 nm to 2000 nm. The compositions described and claimed do not include styrene-butadiene or styrene-isoprene block copolymers, hydrogenated or non-hydrogenated; thermoplastic polyurethanes, polystyrene-butadiene grafted polymers or styrene core-shell polymers.

14 Claims, 1 Drawing Sheet

(56) References Cited

FOREIGN PATENT DOCUMENTS

| DE | 3814783 A1 | 11/1989 |
|---|---|---|
| DE | 19710442 B4 | 2/2008 |
| EP | 110151 B1 | 3/1986 |
| EP | 1659145 B2 | 6/2016 |
| RU | 2160749 C2 | 12/2000 |
| RU | 2232781 C2 | 7/2004 |
| RU | 2476456 C2 | 2/2013 |
| RU | 2478112 C2 | 3/2013 |
| WO | WO 2008/050909 A1 | 5/2008 |
| WO | WO2014097074 A1 | 6/2014 |

OTHER PUBLICATIONS

Search Report for Russian patent application 2018137867/04(0627730 dated Oct. 27, 2020, 2 pages (Translation in English provided).

\* cited by examiner

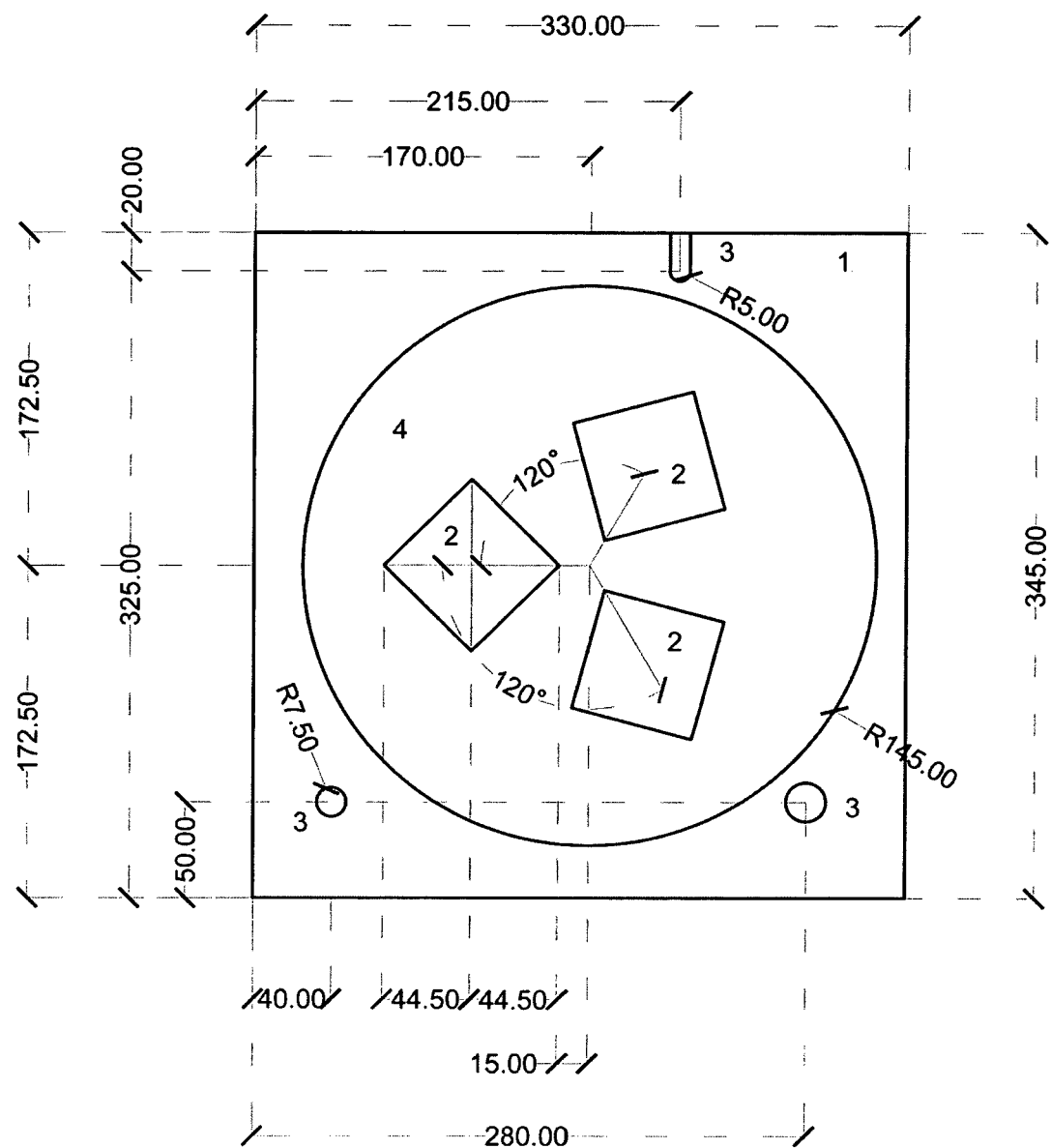

EXPANDABLE VINYL AROMATIC COMPOSITION CONTAINING FUNCTIONALIZED ETHYLENE-VINYL ACETATE COPOLYMER

The present invention relates to expandable polymeric compositions containing vinyl aromatic polymers and/or copolymers, and a preparation process thereof.

The polymeric compositions according to the present patent application can be used for producing packaging with dynamic cushioning, with a pleasant touch, with reduced abrasive power, wherein the expanded particles constituting the packaging adhere well to one another and do not come detached during use, and the loss of blowing agent during storage at atmospheric pressure and ambient temperature is comparable to that of expandable vinyl aromatic polymers.

The present invention further relates to foams containing the compositions described and claimed in the present patent application, in the form of particles, which can be used as packaging and have reduced abrasive power and improved resistance to impact.

The compositions described and claimed in the present patent application show reduced abrasive power, improved resistance to impact, and a reduced elastic modulus. Said compositions are used in the packaging sector, as packaging, where the improved elastic properties of the composition lead to an advantage in terms of the absorption of impacts and surface quality. Thanks to the compositions described and claimed, the packaging absorbs better dynamic cushioning at low loads (low weight/surface area ratio) and has reduced abrasive power against the packaged surfaces. Finally, said compositions further guarantee low permeability to the blowing agent.

In the present patent application, all the operating conditions included in the text must be considered as preferred conditions even if this is not specifically stated.

For the purpose of this text the term "comprise" or "include" also comprises the term "consist in" or "essentially consisting of".

For the purpose of this text the definitions of the intervals always comprise the extremes unless specified otherwise.

Packaging obtained from expandable polystyrene still constitutes a large majority of the components intended for protecting the packaged goods against impacts. However, polystyrene foams as such are closed cell foams and are notoriously rigid; the intrinsic rigidity of the material means that the surface of the packaging has, according to the density and degree of sintering of the expanded particles, either the tendency to scratch the packaged surfaces (which must then be protected with polyethylene coatings or similar) or the tendency to peel due to de-adhesion of the beads. Furthermore, the reduced elasticity of the foam makes it perform better in terms of absorbing impact with loads, per unit of surface area expressed as the ratio between the weight of the packaged item and the contact surface, greater that 5 kPa, which may be too high for goods such as TVs, electronic or mobile equipment. Normally, this problem is overcome by reducing the "active" surface area of the shock absorbing packaging, shaping it with relevant ribs, which however give the packaging complex shapes and undercuts that can be made only through the molding of individual pieces.

Alternatively to 100% styrene foams, polyolefin-based foams can be used, particularly expanded polyethylene and polypropylene which, although having good tribological and dynamic cushioning properties, are characterized by high diffusivity of the blowing agents and cannot therefore be transported in the expandable phase (with apparent densities greater than or equal to 500 kg/m$^3$) but only in the already expanded form and therefore with lower efficiency in terms of transport costs.

A further alternative is foams containing both a styrene component and a polyolefin component.

EP 110151 describes a process for preparing modified polyolefin particles and related polymeric foams, and that also contain a blowing agent. The modified polyolefin particles contain cross-linked polyolefin particles, preferably cross-linked ethylene-vinyl acetate copolymers, and a vinyl aromatic polymer, preferably styrene. In particular, the foams described contain from 25% to 87% of a modified polyolefin, for example an ethylene-vinyl acetate copolymer, and from 13% to 75% of polystyrene.

DE 3814783 describes a polymeric composition comprising:
a) from 30% to 60% by weight of an ethylene-vinyl acetate copolymer that has a vinyl acetate content that ranges from 3 to 6% by weight, preferably from 4% to 5% by weight;
b) from 30% to 60% by weight of polystyrene,
c) from 0.1% to 2% by weight of an inorganic additive in the form of finely divided fiber
d) from 5% to 20% of a hydrocarbon that has from 4 to 5 carbon atoms or a halogenated hydrocarbon group that has from 1 to 2 carbon atoms, and optionally
e) from 0.05% to 2% by weight of an organic cell regulator and optionally
f) further additives.

EP 1659145 relates to polymer pearls that contain a resin containing modified olefin polymers, polystyrene polymers and a blowing agent. The styrene monomer used to form the styrene polymer must be used in a quantity that ranges from 100 to 1000 parts by weight with respect to the polyolefin polymer. The beads have a bulk density that ranges from 0.012 to 0.20 g/cm$^3$, and they have an absorbency ratio that ranges from 698 cm$^{-1}$ to 2850 cm$^{-1}$ obtained with an infra-red absorbency ratio measured with ATR infra-red spectroscopy in the range from 0.1 to 2.5.

US 2004/0152795 describes an expandable polymeric composition that comprises from 20% to 80% by weight of polyolefin particles, for example an ethylene-vinyl acetate copolymer, in which ethylene is at least 50%; from 80% to 20% of a vinyl aromatic polymer, for example polystyrene; from 1.5% to 20% by weight of a blowing agent calculated with respect to the weight of the polyolefin particles; from 0.1 to 5 parts by weight of limonene, calculated on 100 parts of composition.

WO 2008/050909 describes expandable polymeric granules that contain particles of a polystyrene resin; for example a polystyrene polymer; particles of a polyolefin resin, for example an ethylene-vinyl acetate copolymer; and from 5.5% to 13% of a blowing agent, said granules obtained by impregnating and polymerizing from 140 to 600 parts by weight, to 100 parts of a polyolefin resin, of a styrene monomer on a polyolefin resin; wherein the average thickness of the surface layer observed via SEM ranges from 15 μm to 150 μm.

DE 2413375 describes a process for preparing expanded particles that contain from 10 to 95 parts by weight of a styrene polymer, for example polystyrene; from 90 to 5 parts by weight of an ethylene polymer, for example an ethylene-vinyl acetate copolymer; from 0.5 to 10 parts by weight of a solubilizing agent and from 2% to 15% of a blowing agent; all the quantities are calculated on 100 parts of the total composition. The solubilizing agent is a substance that helps the dispersion of polymers in the mixture.

DE 2413408 describes expandable masses of plastic material based on mixtures that contain from 10 to 95 parts by weight of at least one styrene polymer, for example polystyrene; from 90 to 5 parts by weight of at least one ethylene polymer, for example an ethylene-vinyl acetate copolymer; from 0.5 to 30 parts by weight of at least one solubilizing agent and from 2% to 15% of a blowing agent; all the quantities are calculated on 100 parts of the total composition. Also in this case the solubilizing agent is a substance that helps the dispersion of polymers in the mixture.

CA 2148991 describes an expandable composition that can be used for producing elastic foams. Said composition comprises:
a) from 75% to 99% by weight of polystyrene and/or a styrene copolymer containing at least 50% by weight of copolymerizable styrene;
b) from 0% to 24% by weight of at least one elastomer that is soluble in styrene, for example polybutadiene;
c) from 1% to 25% by weight of a grafted copolymer with a "core/shell" structure;
d) from 1 to 15% by weight of a low-boiling point blowing agent calculated on the sum of a), b) and c).

CA 2148992 describes an expandable composition that can be used for producing elastic foams. Said composition comprises:
a) from 50% to 90% by weight of polystyrene and/or a styrene copolymer containing at least 50% by weight of copolymerizable styrene;
b) from 5% to 30% by weight of at least one elastomer that is soluble in styrene, for example polybutadiene;
c) from 5% to 20% by weight of at least a block copolymer containing styrene, for example styrene-butadiene, styrene-isoprene or mixtures thereof;
d) from 1 to 15% by weight of a low-boiling point blowing agent calculated on the sum of a), b) and c);
wherein in the pearls of expandable polystyrene component b) is in the form of particles, component c) is in the form of particles that have an average dimension that ranges from 0.2 to 2 µm in the polystyrene phase.

CA 149002 describes expandable styrene polymers for elastic polystyrene foams that comprise:
a) from 50% to 75% by weight of polystyrene and/or a styrene copolymer that contains at least 50% by weight of copolymerizable styrene,
b) from 5% to 30% by weight of an elastomer soluble in styrene, which is in the form of particles having an average diameter that ranges from 0.2 µm to 2 µm;
c) from 5% to 20% by weight, calculated on the sum of a) and b), of at least one block copolymer containing styrene;
d) from 15% to 50% by weight, calculated on the sum of components from a) to d), of at least one polyolefin;
e) from 1% to 15% by weight, calculated on the sum of components from a) to d), of at least one low boiling point blowing agent;

DE 19710442 relates to polymers suitable for the preparation of impact-resistant foams; in particular it describes an SB/S—(S)n copolymer wherein SB is styrene-butadiene, S is a styrene block, the distribution of monomers is casual, n is 0 or 1, the block styrene is present in quantities comprised from 5 to 40% by volume. The polymers comprise from 50% to 95% by weight of polystyrene or of a styrene copolymer that contains up to 50% by weight of a polymerizable comonomer.

US 2013/0140728 and US 2010/143697 relate to expandable thermoplastic compositions having a reduced loss of blowing agent, a high capacity to expand, and that can be processed in granules that have high rigidity and at the same time good elasticity. Said compositions comprise a polymeric matrix that contains:
a) from 45% to 98.9% by weight of a styrene polymer, in particular polystyrene;
b) from 1% to 45% by weight of a polyolefin, in particular an ethylene-vinyl acetate copolymer, whose particles have an average diameter that ranges from 1 nm to 2000 nm.
c) from 0.1% to 10% by weight of a hydrogenated or non-hydrogenated styrene-butadiene block copolymer;
d) a blowing agent.

US 2011/0065819 relates to expandable polymer beads of thermoplastic material that have a reduced loss of blowing agent, a high capacity to expand and that can be processed in granules that have high rigidity and at the same time good elasticity. Said expandable polymer beads comprise:
a) from 45% to 97.8% by weight of styrene polymer;
b1) from 1% to 45% by weight of a polyolefin, for example an ethylene-vinyl acetate copolymer, which has a melting point that ranges from 105° C. to 140° C.
b2) from 0 to 25% by weight of a polyolefin whose melting point is less than 105° C.;
c1) from 0.1% to 25% by weight of a styrene-butadiene block copolymer;
c2) from 0.1% to 10% by weight of a styrene-ethylene-butylene block copolymer;
d) from 1% to 15% by weight of a blowing agent;
e) from 0% to 5% by weight of a nucleating agent.

US 2011/268972 relates to an expandable thermoplastic material in the form of pearls having a reduced loss of blowing agent and a high capacity to expand. Said material may be processed in granules that have high rigidity and at the same time good elasticity. Said material comprises:
a) a continuous phase that consists of a styrene polymer;
b) a dispersed phase that consists of a polyolefin, for example an ethylene-vinyl acetate copolymer, with a melting point that reaches up to 140° C.;
c) a second dispersed phase that consists of a styrene-butadiene or styrene-isoprene block copolymer; a thermoplastic polyurethane, a polystyrene-butadiene grafted polymer or a styrene core-shell polymer;
wherein the dispersed phase is in the form of particles having an average diameter that ranges from 1 nm to 2000 nm.

Known expandable vinyl aromatic polymer compositions used for packaging are obtained with expensive polymer materials or processes. Furthermore, said compositions require special storage and transport conditions, or need to be transformed shortly after impregnation with a blowing agent.

The Applicant has therefore found a polymeric composition wherein the ethylene-vinyl acetate copolymer is finely dispersed with excellent chemical or physical adhesion to the vinyl aromatic component.

The chemical or physical adhesion of the copolymer on the vinyl aromatic component takes place thanks to the molecules and process used. The adhesion generates distributions of sizes of the ethylene-vinyl acetate copolymer such as to guarantee the mechanical properties and low migration of the blowing agent as described in this patent application.

This allows obtaining expandable polymeric compositions that are easy to prepare, in which the blowing agent maintains a constant concentration over time. The packaging, obtained by transforming the expandable vinyl-aromatic compositions covered by this patent application, has excellent dynamic cushioning, does not damage the surfaces of the packaged goods and does not break up during use, conserving the adhesion of the sintered expanded beads between each other.

Therefore the object of the present patent application is an expandable polymeric composition comprising:
a) from 70% to 90% by weight of a vinyl aromatic polymer and/or copolymer, calculated with respect to (a)+(b);
b) from 10% to 30% by weight of an ethylene-vinyl acetate copolymer (EVA) containing a percentage that ranges from 10% to 30% by weight of vinyl acetate, calculated with respect to (a)+(b);
c) from 3 to 10 parts by weight of a blowing agent, calculated on 100 parts of component a) added to component b);
such copolymer (b) being distributed in the polymer (a) in the form of particles having an average volumetric diameter ranging from 1 nm to 2000 nm; and with the proviso that said polymer composition does not contain a hydrogenated or non-hydrogenated styrene-butadiene or styrene-isoprene block copolymer, a thermoplastic polyurethane, a polystyrene-butadiene grafted polymer or a styrene core-shell polymer.

Said copolymer (b) chemically or physically adheres to the vinyl aromatic polymer and/or copolymer (a).

The average volumetric diameter ($D_v$) or $D(4,3)$ of a particle is used when it is necessary to consider that the contribution that each particle gives to the fractional volume of the dispersed phase (FASE GEL). $D(4,3)$ is equal to the ratio between the statistic moments of 4th degree $[\Sigma N_i(D_i)^4]$ and of 3rd degree $[\Sigma N_i(D_i)^3]$ of the statistical distribution of the diameters of the particles. It is calculated through the following general formula:

$$D_v = D(4,3) = \Sigma N_i(D_i)^4 / \Sigma N_i(D_i)^3$$

where $N_i$ e $D_i$ represent the number $N_i$ of particle having the diameter $D_i$ (a bibliographical reference is R. D. Cadle, "Particle Size Analysis"—New York (1965) pag. 27-50) and it can be determined experimentally through Transmission Electron Microscopy (T.E.M.) on thin layers of polymer contrasted with ruthenium tetroxide, followed by the acquisition of the apparent diameters of the particles, statistical processing thereof.

A further embodiment of the present invention is comprised by the processes for the preparation of the compositions described and claimed in the present patent application. Said processes can be chosen from a continuous mass, extrusion, suspension or mass-suspension polymerization process.

The chemical adhesion of the copolymer (b) to the polymer and/or copolymer (a) can be obtained by grafting the vinyl aromatic polymer and/or copolymer onto component (b); while the physical adhesion of the copolymer (b) can be obtained by functionalizing component (b) with polar groups.

The expandable polymeric compositions described and claimed, after transformation, allow obtaining packaging foams with reduced abrasive power and improved resistance to impact.

The elastic characteristic of the foam allows dynamic cushioning at low loads to which light goods or with large surface areas are subject (e.g. electronic devices and interior furnishings). Hence packaging can be produced with larger contact surfaces, obtaining it by cutting large volume blocks, rather than having to obtain it by molding shaped pieces, hence more expensive equipment and processes are required, which are less efficient in terms of productivity and less flexible in production, with molds dedicated to a single series of products.

Other advantages of the present invention are the improved tribological characteristic, which preserves the surfaces, particularly glossy ones, of the packaged goods and the transformation simplicity; it does not require special precautions in the final expansion step, simplifying the whole production chain.

The addition of a blowing agent has the aim of obtaining an expandable foam. The final expanded product guarantees an improved elastic modulus, intended for the packaging sector, where the improved elastic properties of the foam lead to an advantage in terms of the absorption of impacts and surface quality. The presence of the dispersed phase, with low elastic modulus, confers better dynamic cushioning to the packaging at low loads, because it exhibits a low ratio between weight and surface area, and lower abrasive power against the packaged surfaces. The composition described and claimed further guarantees low permeability to the blowing agent, simplifying both transport and storage.

The expandable polymeric composition according to the present invention is particularly advantageous with respect to the expanded polyolefins used in packaging applications because, being expandable it allows cost savings during the transport step in which it is not yet expanded.

With respect to the expandable foams flexibilized with polyolefins of the prior art, the present expandable polymeric composition exhibits better stability of the blowing agent with direct consequences on the storage time of the product and the expansion process, and indirect consequences on the storage methods which are less expensive. In fact, the products known in the state of the art may require transport in expensive sealed metal drums; these are used to delay the separation of the blowing agent since the latter can create flammable and/or explosive atmospheres.

The storage time is important for products with high blowing agent release. Typically for storage, cooling systems need to be used and, above all, precautions taken to prevent combustion. All this can be avoided with the products that contain the compositions described and claimed herein. Said products are stored like a normal expanded polystyrene (EPS) product and exhibit a similar release of blowing agent, therefore further precautions are not required for safety protection. A further advantage is that the products according to the present invention can expand and sinter more simply since the blowing agent is more easily withheld inside it, while products of the prior art can have serious problems if they are not stored appropriately.

Further objects and advantages of the present invention will appear more clearly from the following description and appended FIGURES, provided by way of non-limitative example, which represent preferred embodiments of the present invention.

FIG. 1 illustrates the system used for measuring the abrasive power of some preferred compositions according to the present invention.

DETAILED DESCRIPTION

The Applicant now describes in detail the polymeric compositions according to the present patent application.

The present invention relates to an expandable polymeric composition comprising:

a) from 70% to 90% by weight of a vinyl aromatic polymer and/or copolymer, calculated with respect to (a)+(b);
b) from 10% to 30% by weight of an ethylene-vinyl acetate copolymer (EVA) containing a percentage that ranges from 10% to 30% by weight of vinyl acetate, calculated with respect to (a)+(b);
c) from 3 to 10 parts by weight of a blowing agent, calculated on 100 parts of component a) added to component b);

such copolymer (b) being distributed in the polymer (a) in the form of particles having an average volumetric diameter ranging from 1 nm to 2000 nm; and with the proviso that said polymeric composition does not contain a hydrogenated or non-hydrogenated styrene-butadiene or styrene-isoprene block copolymer, a thermoplastic polyurethane, a polystyrene-butadiene grafted polymer or a styrene core-shell polymer.

Said copolymer (b) chemically or physically adheres to the vinyl aromatic polymer and/or copolymer (a).

As mentioned previously, the chemical adhesion of the copolymer (b) to the polymer and/or copolymer (a) can be obtained by grafting the vinyl aromatic polymer and/or copolymer onto component (b); while the physical adhesion of the copolymer (b) can be obtained by functionalizing component (b) with polar groups.

Thanks to the chemical or physical adhesion of the EVA component onto the vinyl aromatic polymer and/or copolymer it is possible to obtain particles of EVA with sizes less than or equal to 2000 nm, thus ensuring a uniform dispersion of the EVA copolymer. The size of the EVA copolymer particles in the composition described and claimed can range from 1 nm to 2000 nm (1000 nm equals 1 µm), preferably it can range between 10 nm and 2000 nm, more preferably between 100 nm and 1000 nm, even more preferably between 100 nm and 500 nm.

These distributions of dimensions allow the compositions described and claimed to expand later and to maintain the blowing agent for a period of over 30 days. Thanks to this size characteristic, to obtain the compositions described and claimed, it is possible to reduce the necessary quantity of EVA, reaching anyway the mechanical performance of reduced abrasive power and improved resistance to impact, and above all the processability of the expandable compositions in the form of granules or beads previously mentioned.

The improved stability of the blowing agent coupled with the improved mechanical performance, particularly the improved surface aspect as previously mentioned, solves the technical problems currently posed in the state of the art.

The quantity of vinyl aromatic polymer and/or copolymer ranges from 70% to 90% by weight, preferably from 80% to 90% by weight, more preferably from 85% to 90% by weight.

The vinyl aromatic monomers used for preparing the vinyl aromatic polymer and/or copolymer have the general formula (I):

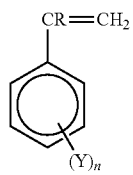

(I)

In formula (I) R is a hydrogen or a methyl group, n is zero or an integer that ranges from 1 to 3, Y is chosen from a chloromethyl, an alkyl group or an alkoxy group having from 1 to 3 carbon atoms, a halogen preferably chosen from chlorine or bromine.

Preferred vinyl aromatic monomers having formula (I) are chosen from styrene, α-methylstyrene, vinyltoluene isomers, ethylstyrene isomers, propylstyrene isomers, chlorostyrene isomers, methylchlorostyrene isomers, methoxystyrene isomers, acetoxystyrene isomers, hydroxystyrene isomers, methylhydroxystyrene isomers and mixtures thereof. More preferably, said vinyl aromatic monomers can be chosen from styrene and α-methylstyrene.

Vinyl aromatic monomers having general formula (I) can be used alone, mixed together or mixed up to 35% by weight with other copolymerizable vinyl monomers, such as monomers chosen from a (meth)acrylic acid, maleic anhydride, $C_1$-$C_{18}$ alkyl esters of (meth)acrylic acid such as ethyl acrylate, methyl methacrylate, butyl acrylate, 2-ethyl hexylacrylate, dodecyl acrylate, dodecyl methacrylate, stearyl acrylate, stearyl methacrylate, glycidyl methacrylate, ethylene glycol dimethacrylate, or mixtures thereof, amides and nitriles of (meth)acrylic acid, such as acrylamide, methacrylamide, dimethylamino ethyl methacrylate, acrylonitrile, methacrylonitrile, butadiene, ethylene, divinylbenzene.

The weight average molecular weight (MW) of the vinyl aromatic polymer component (a) is comprised between 130 kDa and 250 kDa. Molecular weights (MW) of component (a) lower than 130 kDa confer too high fluidity to the polymer, which causes the collapse of the beads during the expansion process. Molecular weights (MW) of component (a) greater than 250 kDa confer an insufficient expansion speed to the polymer and an inappropriate final density of the expanded product.

The quantity of ethylene-vinyl acetate (EVA) necessary for modifying component (a) can range from 10% to 30% by weight, preferably from 10% to 25% by weight, more preferably from 10% to 20% by weight. Within these ranges the compositions described and claimed maintain the technical properties and effects described.

Lower quantities of copolymer (b) than 10% by weight are not sufficient to substantially modify the mechanical performance, while quantities of copolymer (b) over 30% cause a loss of blowing agent in too short time with respect to the requirements for normal expandable vinyl aromatic resins.

The ethylene-vinyl acetate EVA copolymer (b) can have a vinyl acetate (VA) comonomer content comprised between 10% and 30% by weight, preferably comprised between 14% and 30% by weight, more preferably between 15% and 20% by weight.

The ethylene-vinyl acetate EVA copolymer (b) can have a weight average molecular weight (MW) less than or equal to 130000 Dalton (measured by means of Gel Permeation Chromatography, GPC, at high temperature), preferably comprised between 80000 and 120000 Dalton.

The VA content is one of the factors that contributes to reaching the particle sizes of EVA copolymer. By doing so, it is possible to obtain the mechanical and tribological performance previously illustrated, and longer storage times of the expandable composition with respect to the composition of the prior art.

The melting point of the EVA copolymer is less than 100° C., preferably ranging between 60° C. and 79° C.

The chemical or physical adhesion of the copolymer (b) to the vinyl aromatic polymer and/or copolymer (a) can be obtained by modifying the EVA copolymer with methods known in the state of the art.

A known method is that of grafting a vinyl aromatic polymer and/or copolymer onto EVA, making a vinyl aromatic monomer react with EVA in presence of radical initiators, such as peroxides, with analogous processes to those used in the production of HIPS. In this way a chemically adhered EVA is obtained. In this case the composition described and claimed can be obtained in a single reactor or in a series of reactors with a discontinuous supply as described in U.S. Pat. No. 4,282,334; or with a semi-continuous or continuous supply followed if necessary by one or more removal steps of residual monomers and solvent.

Another method for grafting a vinyl aromatic polymer onto EVA consists of reacting a vinyl aromatic polymer with an EVA copolymer, functionalized with chemically reactive groups, polar groups, as described in the article of Xanthos M. and Dagli S. S. "Polymer Engineering and Science 31(13) pages 929-935 (1991)". In this way, the physical adhesion is obtained.

The EVA copolymer in the composition described and claimed herein already has a certain affinity with the vinyl aromatic polymers and/or copolymers. This affinity can be increased to obtain average volumetric diameters of the particles of component (b) dispersed in component (a) less than 2000 nm, by functionalizing the EVA copolymer EVA with vinyl monomers such as, for example, (meth)acrylic acid or alkyl ester derivatives thereof with 1 to 8 carbon atoms, or preferably using from 0.2% to 1% by weight of maleic anhydride as described, for example, in U.S. Pat. Nos. 3,177,269, 4,612,155 or 6,331,595.

In the composition described and claimed herein, any blowing agent can be used that is able to be incorporated into the vinyl aromatic polymer and/or copolymer. Preferably, the blowing agent is a liquid substance with a boiling point, at atmospheric pressure, comprised between 10° C. and 80° C., more preferably comprised between 20° C. and 60° C. The blowing agent is contained in quantities from 3 parts to 10 parts, preferably from 3 parts to 7 parts, calculated on 100 parts of the sum of the quantities of component (a) and of component (b). Preferred blowing agents are chosen from aliphatic or cycloaliphatic hydrocarbons containing from 3 to 6 carbon atoms, more preferably chosen from n-pentane, iso-pentane, cyclopentane, butane, iso-butane and mixtures thereof; halogenated derivatives of aliphatic hydrocarbons containing from 1 to 3 carbon atoms, more preferably chosen from dichlorodifluoromethane, 1,2,2-trifluoroethane, 1,1,2-trifluoroethane; carbon dioxide.

The composition described and claimed herein can be prepared with processes known in the state of the art which can be chosen from a continuous-mass, extrusion, suspension or mass-suspension polymerization process. The continuous-mass process is preferred. Further subject matter of the present invention is a continuous mass process for preparing the expandable polymeric compositions described and claimed herein. Said process comprises the following steps:

i) if the polymer and/or copolymer (a) is in granules
  1. heating said vinyl aromatic polymer and/or copolymer (a) to a temperature higher than the related melting point together with an ethylene-vinyl acetate copolymer (b), functionalized with polar groups, preferably (meth)acrylic acid and alkyl ester derivatives thereof having from 1 to 8 carbon atoms, more preferably functionalized with maleic anhydride, even more preferably maleic anhydride in a concentration comprised between 0.2% by weight and 1% by weight with respect to component (b); so as to form a polymeric composition in the molten state;
  2. then incorporating a blowing agent into said polymeric composition in the molten state;

ii) if the vinyl aromatic polymer and/or copolymer (a) is already in the molten state, adding an ethylene-vinyl acetate copolymer (b), functionalized with polar groups, preferably (meth)acrylic acid and alkyl ester derivatives thereof having from 1 to 8 carbon atoms, more preferably functionalized with maleic anhydride, even more preferably maleic anhydride in a concentration comprised between 0.2% by weight and 1% by weight with respect to component (b); and then incorporating a blowing agent to as to form a polymeric composition.

All the known expansion techniques are applicable, from expansion with steam to that with hot air.

Below are some examples for better understanding of the invention and within the scope of application, although not constituting in any way a limitation to the scope of the present invention.

Comparative Example 1: Composition Containing 90% by Weight of GPPS and 10% by Weight of EVA 90 parts by weight of EDISTIR N1782 (manufactured by Versalis s.p.a, since January 2016 marketed as N3782), GPPS with MW of 180 kDa, and 10 parts by weight of GREENFLEX ML50 (Versalis s.p.a, San Donato Milanese, Italy) in the form of granules containing 19% of vinyl acetate, are fed through a hopper into a single-screw extruder. The extruder feeds with a residence time of 7 minutes, at 260 bar and 190° C., a static mixer at the inlet to which 5.5 parts by weight of a mixture of n-pentane (75%) and iso-pentane (25%) are added forming a composition. The composition is distributed onto holes with 0.5 mm diameter, immediately cooled with a water jet, cut with a series of rotating knives as described in patent U.S. Pat. No. 7,320,585, then sent for granulation. The pressure in the granulation chamber is 5 bar and the cutting shear is determined so as to obtain granules of average diameter 1.2 mm. Water is sprayed as a cooling liquid and nitrogen is used as a carrier gas for the granules, which are then dried with a centrifugal dryer and added in a continuous screw mixer, with 3 parts of glycerol monostearate, one part of zinc stearate and 0.2 parts of glycerin per 1000 parts of granules. One part of these granules is stored in a cardboard drum (capacity 20 kg) at a temperature of 25°±2° C. to assess the weight loss of the blowing agent. A month after processing, 2% of residual pentane is measured. The remaining granules are pre-expanded with steam at 100° C., left to rest for one day and used for forming parallelepipeds in compliance with ISO 4651 tests and internal tests to determine the abrasive power.

On one part of the granules, an evaluation with the transmission electronic microscope (TEM) is also performed to determine the size of the second phase (EVA) which reaches values greater than 2000 nm. The EVA second phase not only has dimensions greater than 2000 nm but also has a very wide dispersed phase particle diameter distribution.

Example 1: Composition Containing 90% of GPPS and 10% by Weight of EVA Functionalized with Maleic Anhydride 90 parts by weight of EDISTIR N1782 (manufactured by Versalis s.p.a, since January 2016 marketed as N3782), GPPS with MW of 180 kDa, and 10 parts by weight of COESIVE EV0540 (Materie Plastiche Bresciane, Brescia, Italy) containing 19% of vinyl acetate, and 0.6% of total maleic anhydride are fed into extrusion, pentanization and granulation equipment under the same operating conditions described in COMPARATIVE EXAMPLE 1. One part of the granules obtained is stored in a cardboard drum (capacity 20 kg) at a temperature of 25°±2° C. to assess the weight loss of the blowing agent. A month after processing, 4.9% of residual pentane is measured, and after three months 4% residual. The remaining granules are pre-expanded with steam at 100° C., stored for one day and used for forming parallelepipeds in compliance with ISO 4651 tests and internal tests to determine the abrasive power.

On one part of the granules, an evaluation with the transmission electronic microscope (TEM) is also performed to determine the average volumetric diameter of the second phase which reaches values of 250 nm.

Example 2: Composition Containing Polystyrene Grafted onto 10% of EVA GREENFLEX ML50

The synthesis of polystyrene grafted onto EVA is performed in a pilot mass-suspension polymerization plant comprising an 84 liter volume steel autoclave (reactor R1) with maximum filling of 50 liters, thermostat jacket with pressurized water circuit, and equipped with an anchor stirrer rotating at 100 rpm for mass polymerization; a condenser of the vapors leaving the autoclave which can be used both for distilling part of the reaction mixture removing it from the autoclave, and for reflux condensing the vapors and checking the reaction temperature; a pipe for transferring the reaction mixture from the bottom of the reactor to the top of a 140 liter volume steel autoclave (reactor R2), with maximum filling of 100 liters. R2 is equipped with a thermostat jacket with a pressurized water circuit, Pfaudler stirrer with 3 blades operating at 250 rpm, baffles for polymerization in suspension, discharge valve from the bottom and condenser of the vapors leaving the head of R2, used during the unreacted solvent and monomer removal step. On the head of R1 and R2 there are the following pieces of equipment: nozzle with valve for the manual dosing of solids, nozzle with valve and connection pipes for the dosing of liquids through pumps equipped with mass flow rate meter, nozzles with valve connected to tanks for dosing pressurized liquids. 29 liters of demineralized water are placed in R2, then the pressure is increased with nitrogen to 2.5 bar and vented to 0.5 bar three times to reduce the oxygen content in the autoclave. The internal temperature of the autoclave R2 is increased to 120° C. and 1 liter of water is distilled, then the suspending mixture is added under nitrogen flow comprising a 27 g solution of NaCl in 1 liter of demineralized water, a 13.5 g solution of ETHAPOL 1000 (AKZO-NOBEL) and 40.5 g of dimer of sodium naphthalene sulfonate (Smart Chemicals s.r.l.) in 4 liters of demineralized water. After adding the suspending solutions the internal temperature of R2 is brought to 115° C. and pressurized to 2 bar with nitrogen waiting for the transfer of the reaction mixture from R1.

In a nitrogen environment, 4.05 kg of ethylbenzene (Versalis s.p.a.), 20.9 kg of styrene (Versalis s.p.a.), 2.05 kg of EVA GREENFLEX ML50 (Versalis s.p.a.) are fed into R1 and pressurized with nitrogen at 0.5 bar. The internal temperature of R1 is increased from about 35° C. to 80° C. in 50 mins and maintained at 80° C. for 2 hours to dissolve the copolymer EVA in ethylbenzene and styrene. Once the dissolution is finished, R1 is depressurized and from the nozzle, in a flow of nitrogen, a 60 ml polystyrene container containing 17.6 g of Trigonox 22E50 (AKZO-NOBEL) and a polystyrene container containing 5.4 g of t-DM (ARKEMA) are added. It is pressurized to 1 bar with nitrogen and vented to 0.5 bar. The internal temperature of R1 is increased from 80° C. to 110° C. in 45 mins and maintained at 110° C. for 2 hours 15 minutes, then the internal temperature of the autoclave (1) is increased from 110° C. to 115° C. in 30 minutes and maintained at 115° C. for 15' after the bottom valve of R1 has been opened and the reaction mixture is transferred from R1 to R2 in about 15' increasing the pressure with nitrogen in R1 by about 1 bar greater than that in R2. Once the transfer has finished, the transfer line is flushed with nitrogen under pressure and the bottom valve of R1 is closed in succession with the head valve of R2. R2 is pressurized to 2.5 bar and the internal temperature is brought back to 115° C. The temperature in R2 is maintained at 115° C. for 1 hour and 30', then increased to 153° C. in 2 hours (minimum pressure 6 bar) and maintained at 153° C. for 5 hours. The internal temperature of R2 is reduced from 153° C. to 115° C. in 40' and 10 ml of Fluxair 431 defoamer (NYMCO s.p.a.) are added from a pressurized tank to one liter of demineralized water. R2 is slowly depressurized and the internal temperature is increased to 145° C. in about 2 hours conveying the vapors to the condenser connected at the head to R2. The reaction mixture in R2 is evaporated further with a flow rate of 3 kg/hour for 10 hours, adding 1.5 kg of water to R2 every 30 minutes. After 10 hours, the content of R2 is cooled to a temperature below 30° C. and the suspension of polymer beads in water is discharged by opening the bottom valve above a perforated container with a sieve. The beads are washed with demineralized water. The polymer beads with average diameter of about 1.5 mm are dried in a flow of air at 80° C. for 5 hours. From the transmission electron microscope photo, the average volumetric size of the diameters of the EVA polymer particles dispersed in the polystyrene matrix is about 160 nm.

The polymer obtained is fed into the extrusion, pentanization and granulation equipment and in the conditions described in COMPARATIVE EXAMPLE 1. A part of these granules is stored in a cardboard drum (capacity 20 kg) at a temperature of 25°±2° C. to assess the weight loss of the blowing agent; a month after processing 4.8% of residual pentane is measured, and after three months 4.0% residual. The remaining granules are pre-expanded with steam at 100° C., stored for one day and used for forming parallelepipeds in compliance with ISO 4651 tests and internal tests to determine the abrasive power.

Example 3: Composition Containing Polystyrene Grafted onto 15% of EVA GREENFLEX ML50

The mass-suspension polymerization pilot plant described in EXAMPLE 2 is used. 29 liters of demineralized water are placed in R2, then the pressure is increased with nitrogen to 2.5 bar and vented to 0.5 bar three times to reduce the oxygen content in the autoclave. The internal temperature of the autoclave is increased to 120° C. and 1 liter of water is distilled, then the suspending mixture is added under nitrogen flow comprising a 27 g solution of NaCl in 1 liter of demineralized water, a 13.5 g solution of ETHAPOL 1000 (AKZO-NOBEL) and 40.5 g of dimer of sodium naphthalene sulfonate (Smart Chemicals s.r.l.) in 4 liters of demineralized water. After adding the suspending solutions the internal temperature of R2 is brought to 110° C. and pressurized to 1 bar with nitrogen waiting for the transfer of the reaction mixture from R1.

In a nitrogen environment, 5.40 kg of ethylbenzene (Versalis s.p.a.), 18.50 kg of styrene (Versalis s.p.a.), 3.10 kg of EVA GREENFLEX ML50 (Versalis s.p.a.) are fed into R1 and pressurized with nitrogen at 0.5 bar. The internal temperature of R1 is increased from about 35° C. to 80° C. in 50' and maintained at 80° C. for 2 hours to dissolve the copolymer EVA in ethylbenzene and styrene. Once the dissolution is finished, R1 is depressurized and from the nozzle, in a flow of nitrogen, 18.9 g of Trigonox 22E50 (AKZO-NOBEL) are added in a 60 ml polystyrene container. It is pressurized to 1 bar with nitrogen and vented to 0.5 bar. The internal temperature of R1 is increased from 80° C. to 110° C. in 45' and maintained at 110° C. for 2 hours and the reaction mixture is transferred from R1 to R2 in about 15' increasing the pressure with nitrogen in R1 by about 1 bar greater than that in R2. Once the transfer has finished, the transfer line is flushed with nitrogen under pressure and the bottom valve of R1 is closed in succession with the head valve of R2. R2 is pressurized to 2.0 bar and the internal temperature is brought back to 110° C. Then the temperature in R2 is increased from 110° C. to 115° C. in 30' pressurizing to 2.5 bar with nitrogen. The temperature in R2 is maintained at 115° C. for 2 hours, then increased to 153° C. in 2 hours (minimum pressure 6 bar) and maintained at 153° C. for 4 hours. The internal temperature of R2 is reduced from 153° C. to 115° C. in 40' and 10 ml of Fluxair 431 defoamer (NYMCO s.p.a.) are added from a pressurized tank to one liter of demineralized water. The removal of residual styrene and ethylbenzene after polymerization, after the addition of defoamer, the cooling, the discharge and the drying of the polymer pearls are performed as described in EXAMPLE 2. From the transmission electron microscope photo, the average volumetric size of the diameters of the EVA polymer particles dispersed in the polystyrene matrix is about 180 nm.

The polymer obtained is fed into the extrusion, pentanization and granulation equipment and in the conditions described in COMPARATIVE EXAMPLE 1. A part of these granules is stored in a cardboard drum (capacity 20 kg) at a temperature of 25°±2° C. to assess the weight loss of the blowing agent; a month after processing 4.6% of residual pentane is measured, and after three months 3.8% residual. The remaining granules are pre-expanded with steam at 100° C., stored for one day and used for forming parallelepipeds in compliance with ISO 4651 tests and internal tests to determine the abrasive power.

Example 4: Composition Containing Polystyrene Grafted onto 20% of EVA GREENFLEX HN70 that Contains 28% by Weight of Vinyl Acetate The mass-suspension polymerization pilot plant described in EXAMPLE 2 is used. 29 liters of demineralized water are placed in R2, then the pressure is increased with nitrogen to 2.5 bar and vented to 0.5 bar three times to reduce the oxygen content in the autoclave. The internal temperature of the autoclave is increased to 120° C. and 1 liter of water is distilled, then the suspending mixture is added under nitrogen flow comprising a 27 g solution of NaCl in 1 liter of demineralized water, a 13.5 g solution of ETHAPOL 1000 (AKZO-NOBEL) and 40.5 g of dimer of sodium naphthalene sulfonate (Smart Chemicals s.r.l.) in 4 liters of demineralized water. After adding the suspending solutions the internal temperature of R2 is brought to 110° C. and pressurized to 1 bar with nitrogen pending the transfer of the reaction mixture from R1.

In a nitrogen environment, 6.75 kg of ethylbenzene (Versalis s.p.a.), 16.47 kg of styrene (Versalis s.p.a.), 3.78 kg of EVA GREENFLEX HN70 (Versalis s.p.a.) are fed into R1 and pressurized with nitrogen at 0.5 bar. The internal temperature of R1 is increased from about 35° C. to 80° C. in 50' mins and maintained at 80° C. for 2 hours to dissolve the copolymer EVA in ethylbenzene and styrene. Once the dissolution is finished, R1 is depressurized and a 60 ml polystyrene container containing 21.6 g of Trigonox 22E50 (AKZO-NOBEL) are added from the nozzle, in a flow of nitrogen. It is pressurized to 1 bar with nitrogen and vented to 0.5 bar. The internal temperature of R1 is increased from 80° C. to 110° C. in 45' and maintained at 110° C. for 2 hours and the reaction mixture is transferred from R1 to R2 in about 15' increasing the pressure with nitrogen in R1 by about 1 bar greater than that in R2. Once the transfer has finished, the transfer line is flushed with nitrogen under pressure and the bottom valve of R1 is closed in succession with the head valve of R2. R2 is pressurized to 2.0 bar and the internal temperature is brought back to 110° C. Then the temperature in R2 is increased from 110° C. to 115° C. in 30' pressurizing to 2.5 bar with nitrogen. The temperature in R2 is maintained at 115° C. for 2 hours, then increased to 153° C. in 2 hours (minimum pressure 6 bar) and maintained at 153° C. for 4 hours. The internal temperature of R2 is reduced from 153° C. to 115° C. in 40' and 10 ml of Fluxair 431 defoamer (NYMCO s.p.a.) are added from a pressurized tank to one liter of demineralized water. The removal of residual styrene and ethylbenzene after polymerization, after the addition of defoamer, the cooling, the discharge and the drying of the polymer pearls are performed as described in EXAMPLE 2. From the transmission electron microscope photo, the average volumetric size of the diameters of the EVA polymer particles dispersed in the polystyrene matrix is about 210 nm.

The polymer obtained is fed into the extrusion, pentanization and granulation equipment and in the conditions described in COMPARATIVE EXAMPLE 1. A part of these granules is stored in a cardboard drum (capacity 20 kg) at a temperature of 25°±2° C. to assess the weight loss of the blowing agent; a month after processing 4.5% of residual pentane is measured, and after three months 3.3% residual. The remaining granules are pre-expanded with steam at 100° C., stored for one day and used for forming parallelepipeds in compliance with ISO 4651 tests and internal tests to determine the abrasive power.

Example 5: Synthesis of Styrene-Glycidyl Methacrylate Copolymer

In a plant comprising a supply tank, two vertical PFR reactors in series, equipped with a jacket and thermostat coils, with a stirrer along the vertical axis having blades perpendicular to the axis and free to turn between the thermostat pipes, having two thermostat zones and a free reaction volume of 6.7 liters each, a mixture comprising 93.67 parts of styrene (Versalis s.p.a.), 6 parts of ethylbenzene (Versalis s.p.a.), 0.330 parts of glycidyl methacrylate (SIGMA-ALDRICH) and 0.017 parts of t-DM chain transfer agent (ARKEMA) is continuously fed at a 4 kg/hour flow rate. The mixture is pre-heated in a tank to the temperature of 40° C., is fed through a piston pump from the bottom of the first vertical PFR reactor, in which it is thermostat-regulated to the temperatures of 131° C. in the first zone and 141° C. in the second thermostat regulating zone, with stirring at 55 rpm. The reaction mixture leaving the head of the first PFR is fed with a gear pump to the bottom of the second vertical PFR and is thermostat-regulated to the temperatures of 149° C. in the first zone and 156° C. in the second thermostat regulating zone, with stirring at 20 rpm. The reaction mixture leaving the head of the second PFR, with a polymer fraction equal to about 75%, is fed through a gear pump to a thermostat regulating oil exchanger at 245° C. and then to a vacuum tank, jacketed, thermostat-regulated to 230° C., with a residual pressure of 10 mbar. The unpolymerized reaction mixture fraction is evaporated and the polymer leaving from the bottom of the tank under vacuum is sent by means of a gear pump to the granulator. A styrene—glycidyl methacrylate copolymer is obtained with 0.4% of glycidyl methacrylate and Melt Flow Rate at 200° C./5 kg of 6.9 g/10' mins and MW 190 kDa.

Example 6: Composition Containing the Copolymer Produced in EXAMPLE 5 and COESIVE EV0540

90 parts of styrene-glycidyl methacrylate obtained as described in EXAMPLE 5, and 10 parts of COESIVE EV0540 (Materie Plastiche Bresciane, Brescia, Italia), are fed into extrusion, pentanization and granulation equipment under the operating conditions described in COMPARATIVE EXAMPLE 1. A part of these granules is stored in a cardboard drum (capacity 20 kg) at a temperature of 25°±2° C. to assess the weight loss of the blowing agent; a month after processing 5.2% of residual pentane is measured, and after three months 4.2% residual. The remaining granules are pre-expanded with steam at 100° C., stored for one day and used for forming parallelepipeds in compliance with ISO 4651 tests and internal tests to determine the abrasive power.

On one part of the granules, a TEM assessment is also performed to determine the average volumetric size of the diameters of the particles of the second phase that reaches values of 220 nm.

Dynamic Cushioning Performance Measurements According to ISO 4651.

Samples with approximately the same density of 21 g/liter, according to standard ISO 4651, of COMPARATIVE EXAMPLE 1 and EXAMPLES 1, 2, 3, 4 and 6 were subjected to cushioning performance tests. Table 1 shows the maximum deceleration values expressed in multiples of the acceleration due to gravity (g in m/s$^2$) as a function of the applied pressure (P in kPa), with ratio of the falling height of the dart to the sample thickness of 15. Tables 2 and 3 show the values of Table 1 determined at the second and fifth impact, respectively.

It is observed that the samples of EXAMPLES 1, 2, 3, 4 and 6 have deceleration values with a lower minimum than that obtained with the sample of COMPARATIVE EXAMPLE 1 already at the first impact (Table 1). For the second impact only the samples of EXAMPLES 1, 2, 3, 4 and 6 guarantee the best balance between decelerations and operating pressures (Table 2). For the fifth impact only the samples of EXAMPLES 1, 2, 3, 4 and 6 withstand the stress, still guaranteeing good deceleration values, while the sample of COMPARATIVE EXAMPLE 1 undergoes the de-adhesion of the beads, consequently failing the test (Table 3).

TABLE 1 first impact

|  | Minimum of deceleration (*g) | Pressure at the Minimum of deceleration (kPa) |
|---|---|---|
| COMPARATIVE EXAMPLE 1 | 38 | 6 |
| EXAMPLE 1 | 36.5 | 7 |
| EXAMPLE 6 | 36.8 | 6.3 |
| EXAMPLE 2 | 38.2 | 7.3 |
| EXAMPLE 3 | 37.9 | 7.0 |
| EXAMPLE 4 | 37.5 | 6.6 |

TABLE 2 second impact

|  | Minimum of deceleration (*g) | Pressure at the Minimum of deceleration (kPa) |
|---|---|---|
| COMPARATIVE EXAMPLE 1 | 51.5 | 4 |
| EXAMPLE 1 | 53 | 4.5 |
| EXAMPLE 6 | 49.5 | 4.4 |
| EXAMPLE 2 | 51 | 4.6 |
| EXAMPLE 3 | 50.6 | 4.4 |
| EXAMPLE 4 | 50.8 | 4.2 |

TABLE 3 fifth impact

|  | Minimum of deceleration (*g) | Pressure at the Minimum of deceleration (kPa) |
|---|---|---|
| COMPARATIVE EXAMPLE 1 | Not measurable | Not measurable |
| EXAMPLE 1 | 59 | 3.7 |
| EXAMPLE 6 | 55.3 | 4.1 |
| EXAMPLE 2 | 56.3 | 4.5 |
| EXAMPLE 3 | 56.0 | 4.1 |
| EXAMPLE 4 | 56.6 | 4.0 |

Abrasive Power Measurements.

Table 4 shows the abrasive power measurements of the compositions obtained by the samples of examples 1, 2, 3, 4 e 6 and comparative example 1.

The measurements were taken using a method that is illustrated below.

The method for calculating the abrasive power of the expanded products envisages cylindrical samples of expanded material, with a diameter of 290 mm and thickness of 50 mm, being arranged on rotating equipment as described in FIG. 1. This method is based on the phenomenon of the sliding of a panel of expanded material on a compact homopolymer polystyrene sample (representative of the packaged material). Three plaques (60×60 mm) are arranged on each panel of expanded material, equally spaced out from one another and with respect to the center of rotation. The panel is fixed onto a rotary plate, so as to create relative motion.

FIG. 1 shows the system used for measuring the abrasive power. In FIG. 1:

1 is the supporting mount for the compact homopolymer polystyrene plaques fasten to the fixed basis of the instrument, 2 are the compact homopolymer polystyrene plaques with a thickness of 3.2 mm, 3 are the fastening elements of the mount 1

4 is the cylinder of expanded composition, fasten to the rotor, in contact with the compact homopolymer plaques.

Therefore, the plaques are fixed, whereas the rotation is only applied to the panel of expanded material.

The conditions of the tests are the following:

1. A load centered on each individual plaque of 0.4 kg in order to replicate the equivalent pressure ($\approx 0.1$ kg/cm$^2$) that an item of furniture exerts on the packaging;
2. Rotation speed $\omega=125$ rpm;
3. Wearing time t=60 sec.

The damage caused by the abrasion is evaluated with optical analysis of the "Haze" and "Clarity" on the compact homopolymer polystyrene plaques. "Haze" is the part of incident light diffused at angles over 2.5°, whereas "Clarity" is the part of incident light diffused at angles less than 2.5°.

The analyzed size is reduced from 25 mm of diameter to 10 mm in order to select the most consistent damage caused by the matrix. The expanded compositions have the same density, sintered beads size and flat contact surface with the plaques. This allows exerting uniform and repeatable damage on the plaques.

The presence of fragments of expanded composition indicates reduced adhesion of the expanded beads between one another or breakage thereof during the abrasion test. Table 4 shows the results of the abrasion tests in terms of "Haze", "Clarity" and presence of fragments performed on the compositions prepared in EXAMPLES 1, 2, 3, 4 and 6 and in the COMPARATIVE EXAMPLE 1.

TABLE 4

| Sample | Haze | Clarity | Fragments |
|---|---|---|---|
| COMPARATIVE EXAMPLE 1 | 9 | 88.8 | Yes |
| EXAMPLE 1 | 7.0 | 95 | No |
| EXAMPLE 6 | 5.8 | 97 | No |
| EXAMPLE 2 | 6.4 | 94 | No |
| EXAMPLE 3 | 6.5 | 95 | No |
| EXAMPLE 4 | 6.9 | 96 | No |

Table 4 shows that EXAMPLES 1, 2, 3, 4 and 6 produce lower abrasion than COMPARATIVE EXAMPLE 1, without the further generation of fragments in terms of de-adhesion of the beads.

The invention claimed is:

1. Expandable polymeric composition comprising:
   a) from 70% to 90% by weight of a vinyl aromatic polymer and/or vinyl aromatic copolymer, calculated with respect to (a)+(b);
   b) from 10% to 30% by weight of an ethylene-vinyl acetate copolymer (EVA) containing a percentage that ranges from 10% to 30% by weight of vinyl acetate, calculated with respect to (a)+(b);
   c) from 3 to 10 parts by weight of a blowing agent, calculated on 100 parts of component a) added to component b);
   said ethylene-vinyl acetate copolymer (EVA) being distributed in said vinyl aromatic polymer and/or said vinyl aromatic copolymer in the form of particles having an average volumetric diameter ranging from 1 nm to 2000 nm; and with the proviso that said expandable polymeric composition does not contain a hydrogenated or non-hydrogenated, styrene-butadiene or styrene-isoprene block copolymer, a thermoplastic polyurethane, a polystyrene-butadiene grafted polymer or a styrene core-shell polymer.

2. Polymeric composition according to claim 1 in which the particles of said ethylene-vinyl acetate copolymer (EVA) have an average volumetric diameter ranging from 100 nm to 1000 nm.

3. Polymeric composition according to claim 1 wherein the amount of said vinyl aromatic polymer and/or said vinyl aromatic copolymer ranges from 80% to 90% by weight, calculated with respect to (a)+(b).

4. Polymeric composition according to claim 1 wherein the weight-average molecular weight of said vinyl aromatic polymer ranges from 130 kDa to 250 kDa.

5. Polymeric composition according to claim 1 wherein the amount of said ethylene-vinyl acetate copolymer (EVA) ranges from 10% to 25% by weight.

6. Polymeric composition according to claim 1 in which the content of vinyl acetate comonomer (VA) in said ethylene-vinyl acetate copolymer (EVA) ranges from 14% to 30% by weight.

7. Polymeric composition according to claim 1 wherein said vinyl aromatic polymer and/or said vinyl aromatic copolymer is obtained from a vinyl aromatic monomer of formula (I)

alone, from a mixture including said vinyl aromatic monomer of formula (I) or from a mixture including said vinyl aromatic monomer of formula (I) and copolymerizable vinyl monomers in which said copolymerizable vinyl monomers are present in an amount up to 35% by weight based on the weight of the mixture; in which R is a hydrogen or a methyl group; n is zero or an integer that varies from 1 to 3; Y is selected from a halogen; a chloromethyl; an alkyl group or an alkoxy group having from 1 to 3 carbon atoms.

8. Polymeric composition according to claim 7, wherein said vinyl aromatic monomer of formula (I) is selected from styrene, α-methylstyrene, methylstyrene, ethyl-styrene, vinyltoluene isomers, ethylstyrene isomers, propylstyrene isomers, chloro styrene isomers, methylchlorostyrene isomers, methoxystyrene isomers, acetoxystyrene isomers, hydroxystyrene isomers, of methylhydroxystyrene isomers, and mixtures thereof.

9. Polymeric composition according to claim 7 wherein said copolymerizable vinyl monomers are selected from (meth)acrylic acid, maleic anhydride, alkyl esters of (meth) acrylic acid having 1 to 18 carbon atoms, amides and nitriles of (meth)acrylic acid.

10. A continuous mass process for preparing the polymeric composition according to claim 1, comprising the following steps:
   1. providing said vinyl aromatic polymer and/or said vinyl aromatic copolymer in a form of granules;
   2. heating said vinyl aromatic polymer and/or said vinyl aromatic copolymer to a temperature above its melting point together with said ethylene-vinyl acetate copolymer (EVA), functionalized with polar groups so as to form a polymeric composition in the molten state;

3. then incorporating said blowing agent into said polymeric composition in the molten state.

11. Expanded beads that contain the polymeric composition according to claim 1.

12. Packaging comprising the beads according to claim 11.

13. Packaging comprising the polymeric composition according to claim 1.

14. A continuous mass process for preparing the polymeric composition according to claim 1, comprising the following steps:
   1. providing said vinyl aromatic polymer and/or said vinyl aromatic copolymer in a molten state,
   2. adding said ethylene-vinyl acetate copolymer (EVA), functionalized with polar groups,
   3. and then incorporating said blowing agent to form a polymer composition.

\* \* \* \* \*